Jan. 9, 1962     L. LUFT     3,016,106
APPARATUS FOR CONTINUOUS SEPARATION OF VOLATILE
COMPONENTS OF A GASEOUS MIXTURE
Filed Feb. 17, 1959     2 Sheets-Sheet 1
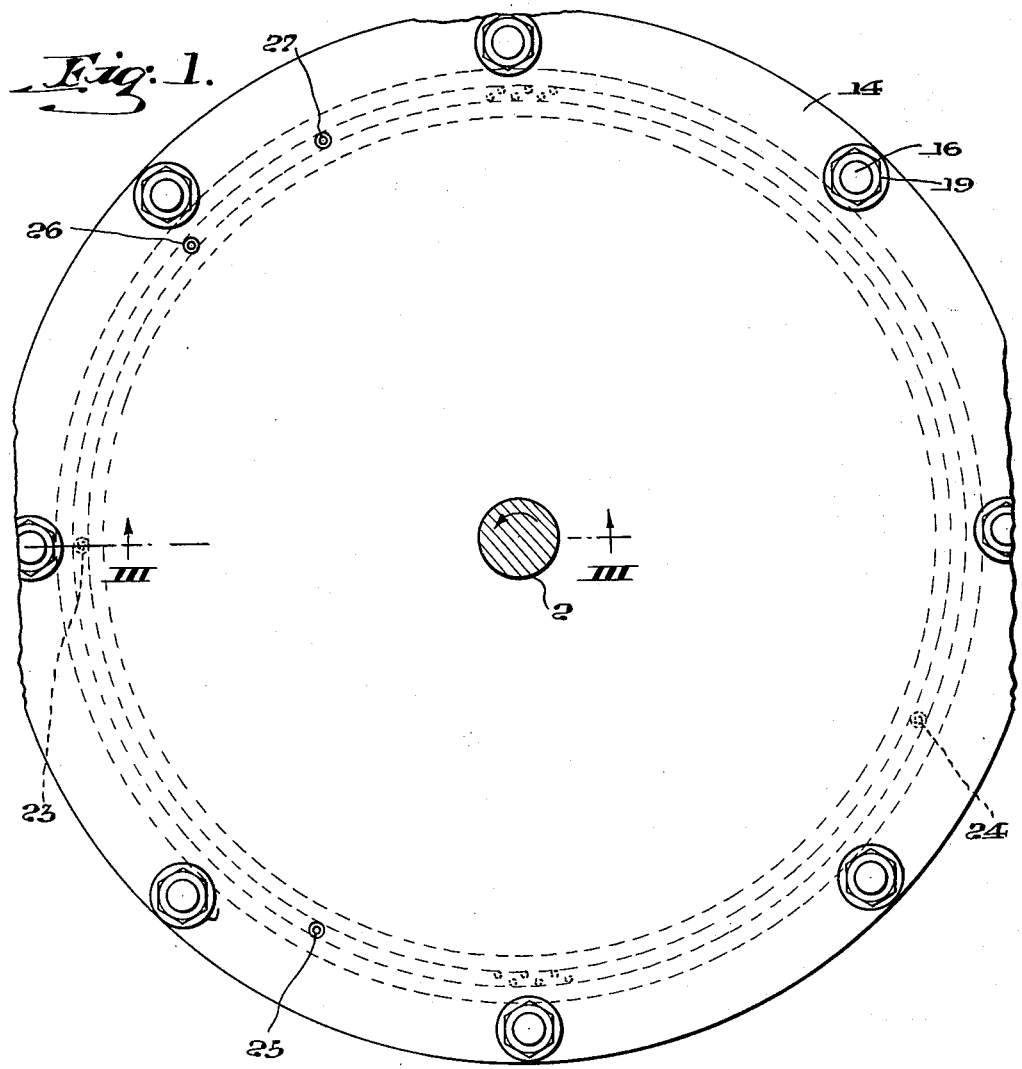
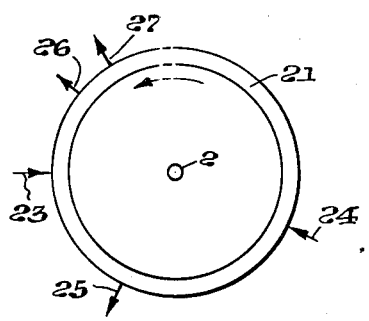
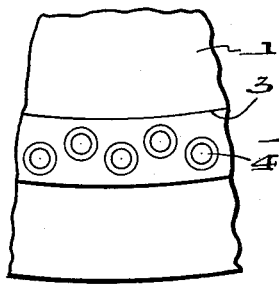
INVENTOR.
LUDWIG LUFT.
BY
Brown, Critchlow, Flick & Peckham
his ATTORNEYS

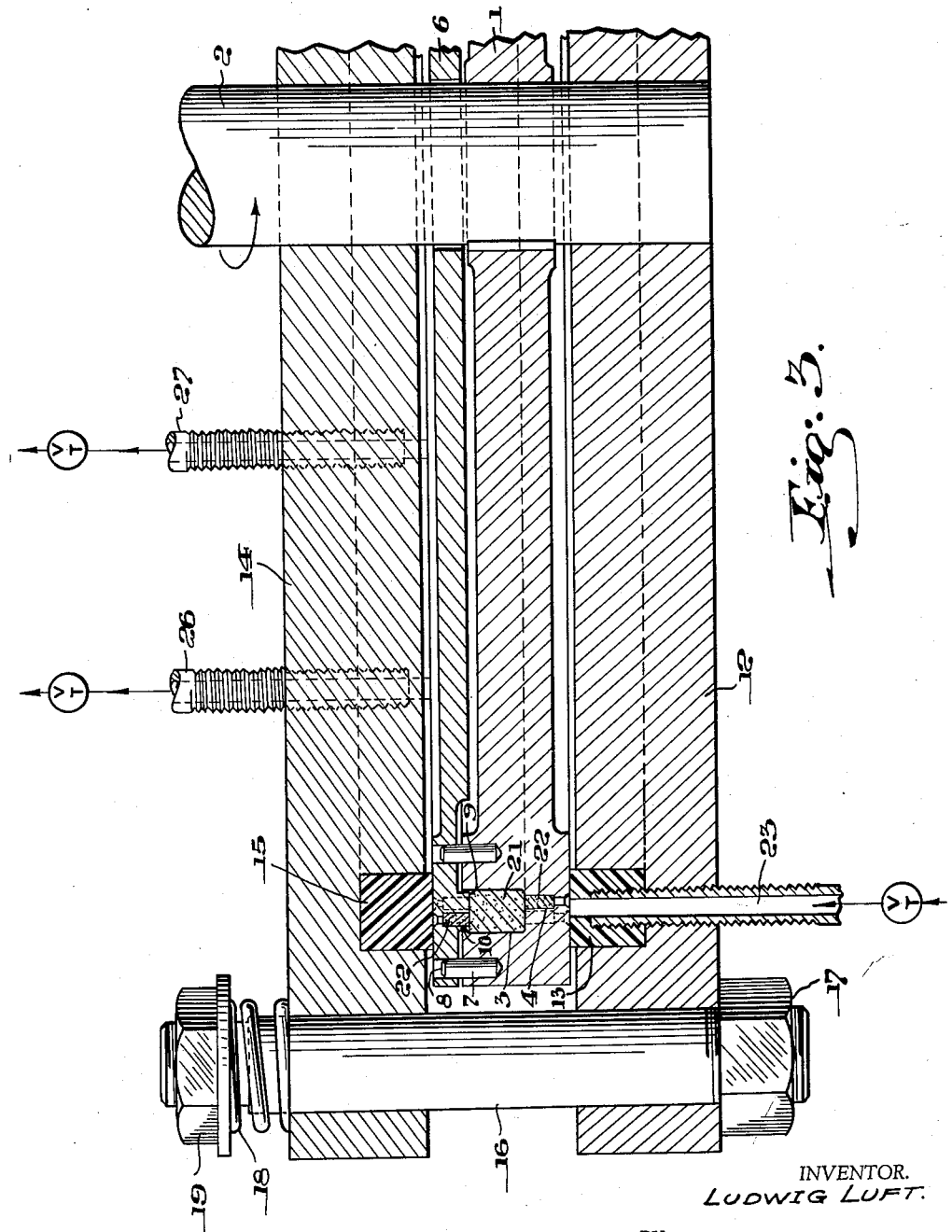

United States Patent Office 3,016,106
Patented Jan. 9, 1962

3,016,106
APPARATUS FOR CONTINUOUS SEPARATION OF VOLATILE COMPONENTS OF A GASEOUS MIXTURE
Ludwig Luft, Cincinnati, Ohio, assignor, by mesne assignments, to Mine Safety Appliances Company, Pittsburgh, Pa., a corporation of Pennsylvania
Filed Feb. 17, 1959, Ser. No. 793,805
5 Claims. (Cl. 183—2)

This invention relates to separation of gases into fractions having different volatilities, and more particularly to what is generally called continuous gas chromatography.

Gas chromatography is a system of separating components of a gas mixture, in which the mixture is passed through a column of gas adsorption material or a pervious material coated with a liquid to make use of the partition coefficient of the sample. Both types of material will be referred to herein as gas separation material. Assuming that the components of the mixture have sufficiently different volatilities, so that one of them has less affinity than the other for the separation material, the first component will be carried by an eluting gas through the packing while the remaining component or components will be held back by the packing material to appear later in the eluting gas stream.

It is among the objects of this invention to provide a simple apparatus for separating components of a gaseous mixture, in which the separation can be carried on continuously, in which two substantially pure fractions can be obtained, and in which the sealing problem is reduced to a minimum.

In accordance with this invention, an endless column of gas separation packing is moved continuously lengthwise in one direction in an unbroken path. A purge gas, as the eluant, is delivered to the column at a predetermined inlet point and is released from it at two outlet points spaced lengthwise of its path of travel in locations where some of the purge gas will flow upstream through the column to both outlet points and the rest of the purge gas will flow in the opposite direction. A volatile mixture containing two components having different volatilities is delivered to the column between the two outlet points. By selecting a packing material for which one of the fractions of the mixture will have less affinity than the other, the first fraction will be carried by the purge gas upstream through the packing and out of it at the upstream outlet point. The second fraction of the mixture will be carried by the packing downstream toward the other outlet point, where it will escape with the purge gas leaving at that point. Preferably, a third outlet is provided at a point adjacent the upstream side of the first mentioned outlet point, so that purge gas which flows in the same direction that the column moves will escape through the third outlet. Suitable apparatus for carrying out the method includes a circular column of gas separation material which is rotated continuously, the inlets and outlets to and from the column being spaced circumferentially around it. The column is carried by a rotating disc between cover plates that seal the opposite sides of the column.

The preferred embodiment of the invention is illustrated in the accompanying drawings; in which:

FIG. 1 is a plan view of my apparatus;
FIG. 2 is an enlarged fragmentary plan view of the rotatable disc without its packing;
FIG. 3 is an enlarged fragmentary vertical section taken on the line III—III of FIG. 1; and
FIG. 4 is a diagram of the system.

Referring to FIG. 3 of the drawings, a circular disc 1 is rigidly mounted on a rotatable shaft 2 which, for the purpose of this description, will be called vertical. Near the periphery of the disc, it is provided with an annular channel 3 extending downward from its upper surface. Although it is not absolutely necessary, it is preferred to connect the bottom of the channel to the bottom of the disc by means of a large number of vertical holes 4 arranged in a circular row extending around the disc. A larger number of holes can be used if they are staggered as shown in FIG. 2. Directly above the disc and freely movable in a vertical direction is a cap plate 6. The plate and disc are connected together by dowel pins 7 projecting from the top of the disc at suitable intervals around it and slidably mounted in vertical holes 8 in the plate. The bottom of the plate may be provided with an annular shoulder 9 that fits a short distance into the top of disc channel 3. A row of staggered vertical holes 10 extend through the shoulder and plate to connect the channel with the top of the plate. Channel 3 thus becomes an annular chamber having openings at top and bottom.

The top and bottom of the rotatable member formed by the disc and cap plate are engaged by cover members that seal the outer ends of the upper and lower rows of holes 4 and 10. The lower cover member consists of a heavy stationary base plate 12, provided in its upper surface with an annular channel containing a ring 13 of suitable sealing and bearing material directly below the lower holes 4. A synthetic plastic material, such as Teflon, is satisfactory for this purpose. The ring projects a short distance above the plate and supports the disc as it rotates. The upper cover member is in the same general form as the lower one, as it includes a heavy metal plate 14, in the bottom of which a ring 15 of sealing and bearing material is mounted. This ring projects a short distance from the bottom of the plate and bears against the top of cap plate 6 directly above holes 10. The two cover plates are held together by means of stud bolts 16 extending through their marginal portions beyond the rotating member. A nut 17 on the lower end of each bolt supports the lower cover plate. The upper cover plate is slidably mounted on the bolts and is pressed downward by coil springs 18 encircling the bolts and compressed between the cover plate and nuts 19 screwed on the upper ends of the bolts. Consequently the two sealing rings 13 and 15 press the disc and its cap plate toward each other.

The internal annular chamber 3 is packed with a suitable gas separation material to form a circular column 21. To prevent this material from entering the holes above and below it and also to help diffuse gas passing through the holes, the holes may be filled with gas pervious material, such as porous metal plugs 22. For delivering a gaseous mixture to the separation column and removing gas fractions from it, inlet and outlet tubes are connected with holes extending vertically through at least one of the plastic bearing rings and the heavy plates containing them. There are two circumferentially spaced inlets, one for the gas mixture to be separated and one for a purge gas. There also are at least two, and preferably three outlets. Although all of these gas passages may be in the same cover plate, and would have to be if holes 4 were absent, it is preferred to locate the inlets in one plate, the bottom one for example, and locate the outlets in the other cover plate. Thus, the inlet 23 for the gas mixture is shown extending up through the lower sealing ring 13 and communicating with the lower ends of some of the holes 4 in the disc. The purge gas inlet 24 is located about half way around the disc from the first inlet, as shown in FIG. 1. One of the outlets 25 extends down through the top plate and sealing ring 15 in a location spaced from inlet 23 in the direction of rotation of the column and is located closer to that inlet than to the purge gas inlet 24. The other two outlets 26 and 27 are at the other side of inlet 23 and likewise are located closer to that inlet than to the other inlet. These last two outlets are farther than outlet 25 from the purge gas inlet 24. The relative positions of the various inlets and outlets around the column are clearly indicated in the diagram of FIG. 4. As indicated there and in FIG. 1, the direction of rotation of the column is such that any given point on it will be carried from inlet 23 to outlet 25 before reaching purge gas inlet 24.

In the operation of this apparatus a gas mixture, composed of known components having different volatilities, is delivered to inlet 23. Generally, the sample will be mixed with a suitable carrier gas, such as nitrogen. The column 21 in the rotating member is formed from a separation material, for which one of the components or fractions of the sample mixture has less affinity than the other. Such materials are well known and form no part of this invention. An eluting or purge gas, such as nitrogen or the like, is delivered to the column through inlet 24. This gas will flow in both directions around the column, some of it flowing upstream relative to the direction of movement of the column and escaping through outlet 25, some continuing past that outlet and around to outlet 26, and the rest of it flowing in the opposite direction to outlet 27. By suitable throttling valves attached to the outlets, the relative amount of purge gas leaving the column at each outlet can be controlled. Although outlet 27 is not absolutely necessary, its use permits the purge gas that is flowing co-current with the column to escape at that point rather than continuing to outlet 26.

The gas sample entering the column at inlet 23 will be separated into fractions by the separation material. The line of least resistance for this gas will be through the column from inlet 23 to outlet 26, because flow in the opposite direction is prevented by the purge gas that is flowing countercurrent to the column toward outlet 26. The gas fraction that has the least affinity for the separation material will be carried countercurrently through it by the purge gas and out of outlet 26. The rest of the entering mixture, however, will be adsorbed or dissolved by the packing sufficiently to be carried by it toward outlet 25. As the rotating column carries this remaining component or components of the mixture counterclockwise around the apparatus, the purge gas flowing in the opposite direction through the packing will elute the adsorbed or dissolved gas and carry it out of outlet 25. Any fraction that the purge gas is unable to elute before it passes inlet 24 will be eluted before outlet 27 is reached and will flow out of that outlet so that clean packing is continuously presented to inlet 23. When the entering mixture contains only two fractions, methane and ethane for example, one substantially pure fraction will leave the column at outlet 26 and the other fraction will leave through outlet 25. Suitable detection devices (not shown) are connected with at least outlets 25 and 26.

By equipping all of the ports of the column with throttling valves, regulation of gas flow in the column and the setting up of the desired pressure zones therein is permitted. Wide separability of components can be obtained by judicious use of inlet and outlet spacing, speed of rotation of the column, flow rates of sample and purge gas, the type of separation material for the column, and the temperature of the column. Since the column is circular or continuous, there is no problem of sealing its ends. The gas flowing in both directions through the column balances itself, and the opposite sides (top and bottom) of the column are effectively sealed by the sealing rings 13 and 15. As the separation material is packed in the rotating member and is carried by it, the material remains undisturbed in its enclosure as the column rotates.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for continuous separation of components of a gas mixture, comprising a rotatable circular member having parallel opposite sides and provided with a concentric annular chamber filled with gas separation material, said member having openings connecting said chamber with at least one of said sides, stationary cover means engaging the opposite sides of said member, means pressing the cover means against said member to seal said chamber, the cover means being provided with two circumferentially spaced inlet passages communicating with the chamber for delivering gases thereto, one of said passages being for a gas mixture to be separated and the other passage being for a purge gas, said cover means also being provided with an outlet passage at each side of said gas mixture inlet passage and communicating with said chamber, one outlet passage being located between said purge gas passage and one side of said gas mixture passage, the other outlet passage being located between said purge gas passage and the opposite side of said gas mixture passage, the said one of said outlet passages being closer than the other to said purge gas inlet, and means for continuously rotating the circular member in a direction to move a given point of said chamber from said gas mixture inlet first to said one outlet and then to said purge gas inlet.

2. Apparatus for continuous separation of components of a gas mixture, comprising a rotatable circular member having parallel opposite sides and provided with a concentric annular chamber filled with gas separation material, said member also being provided with annular rows of holes connecting its opposite sides with said chamber, and stationary cover members engaging the opposite sides of the circular member to seal the outer ends of the holes in said rows, at least one of said cover members being provided with circumferentially spaced passages communicating with some of the adjacent holes in said circular member, there being two inlet passages and a pair of outlet passages, one inlet passage being for a gas mixture to be separated and the other inlet passage being for a purge gas, the sequence of said four passages around said circular member being inlet passage—outlet passage—inlet passage—outlet passage, one of the outlets being closer than the other to said purge gas inlet, and means for rotating the circular member continuously in a direction to move said holes in a circular path from said gas mixture inlet first to said one outlet and then to said purge gas inlet.

3. Apparatus for continuous separation of components of a gas mixture, comprising a rotatable circular member having parallel opposite sides and provided with a concentric annular chamber filled with gas separation material, said member also being provided with annular rows of holes connecting its opposite sides with said chamber, and stationary cover members engaging the opposite sides of the circular member to seal the outer ends of the holes in said rows, at least one of said cover members being provided with circumferentially spaced passages communicating with some of the adjacent holes in said circular member, there being two inlet passages and three outlet passages, one inlet passage being for a gas mixture to be separated and the other inlet passage being for a purge gas, one of said outlet passages being disposed between said purge gas inlet and one side of said gas mixture inlet, the other two outlet passages being disposed between said purge gas inlet and the opposite side of said gas mixture inlet and farther than said one outlet from the purge gas inlet, and means for rotating the circular member continuously in a direction to move said holes in a circular path from said gas mixture inlet first to said one outlet and then to said purge gas inlet.

4. Apparatus for continuous separation of components of a gas mixture, comprising a circular member having parallel opposite sides and provided between said sides with a concentric annular chamber filled with gas separation material, said member also being provided with circumferentially spaced holes connecting at least one of said sides with said chamber, a rotatable shaft extending through said member for rotating it, cover members mounted on said shaft and engaging said opposite sides of the circular member to seal the outer ends of said holes, resilient means pressing the cover members toward each other, at least one of the cover members being provided with circumferentially spaced passages communicating successively with the adjacent holes in the rotating circular member, there being two inlet passages and a pair of outlet passages, one inlet passage being for a gas mixture to be separated and the other inlet passage being for a purge gas, one of said outlet passages being disposed between one side of said purge gas inlet and said gas mixture inlet, the other outlet passage being disposed between the other side of said purge gas inlet and the gas mixture inlet, one of the outlets being closer than the other to said purge gas inlet, and means for rotating said shaft continuously in a direction to move said holes in a circular path from said gas mixture inlet to said one outlet before reaching said purge gas inlet.

5. Apparatus for continuous separation of components of a gas mixture, comprising a circular disc provided in one side with a concentric annular channel containing gas separation material, the disc having an annular row of holes connecting the opposite side of the disc with the base of the channel, a cap plate covering said one side of the disc a slight distance therefrom and provided with an annular shoulder projecting from its inner face and slidably disposed in said channel in engagement with said material, said plate having an annular row of holes therethrough connecting its outer face with said channel, a central shaft for rotating the disc and cap plate together, cover plates engaging the outer faces of the disc and cap plate and sealing the outer ends of said holes, resilient means pressing the cover plates toward each other, the cover plates being provided with circumferentially spaced passages communicating successively with the adjacent holes in the rotating disc and cap plate, there being two inlet passages and a pair of outlet passages, one inlet passage being for a gas mixture to be separated and the other inlet passage being for a purge gas, one of said outlet passages being disposed between one side of said purge gas inlet and said gas mixture inlet, the other outlet passage being disposed between the other side of said purge gas inlet and the gas mixture inlet, one of the outlets being closer than the other to said purge gas inlet, and means for rotating said shaft continuously in a direction to move said holes in a circular path from said gas mixture inlet to said one outlet before reaching said purge gas inlet.

References Cited in the file of this patent

UNITED STATES PATENTS

| | | |
|---|---|---|
| 2,302,807 | Shoeld | Nov. 24, 1942 |
| 2,635,988 | Crowley | Apr. 21, 1953 |
| 2,759,560 | Miller | Aug. 21, 1956 |
| 2,764,253 | Weber | Sept. 25, 1956 |
| 2,869,672 | Findlay | Jan. 20, 1959 |
| 2,891,630 | Hall et al. | June 23, 1959 |